June 6, 1950     F. J. DOFSEN ET AL     2,510,091
METHOD OF SEVERING SPRUES FROM A MOLDED
PART AND SIMULTANEOUSLY MOLDING A
SECOND PLASTIC TO THE PART
Filed Aug. 26, 1947     4 Sheets-Sheet 4
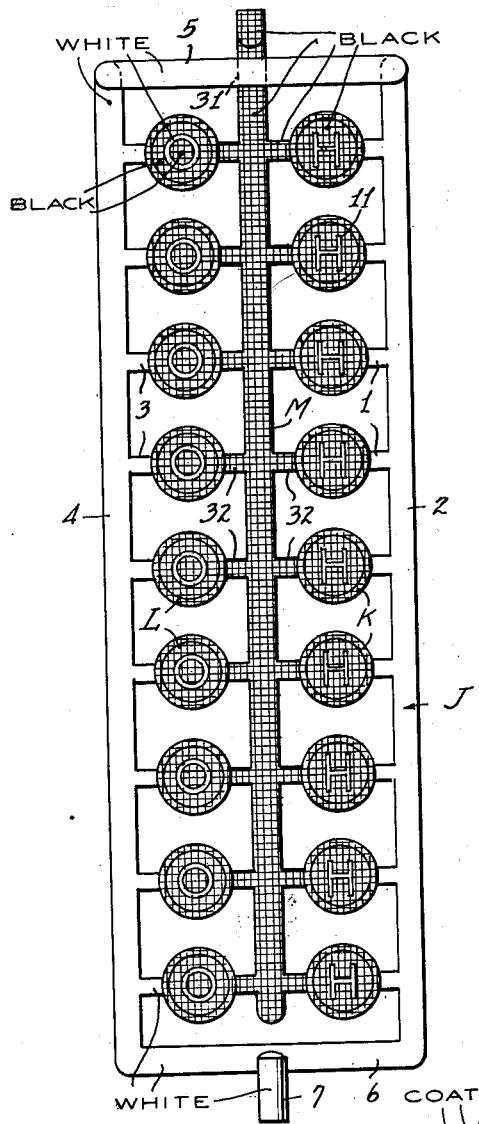
Fig. 12.
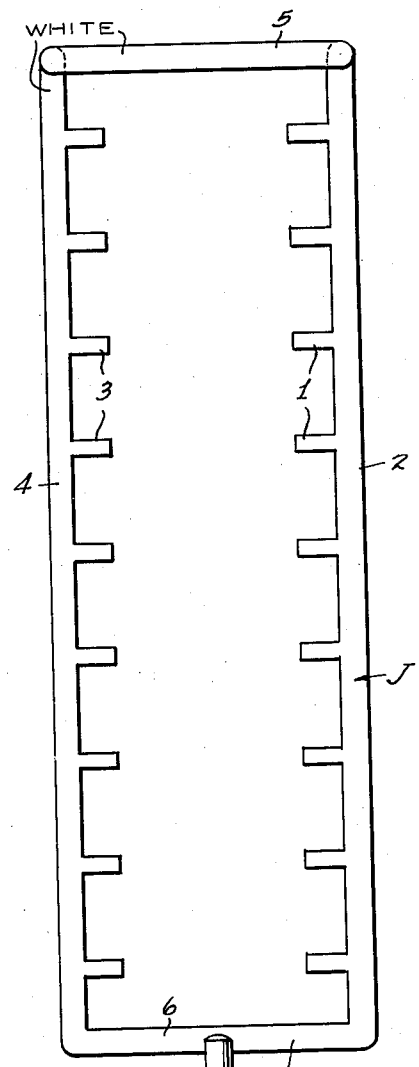
Fig. 13.
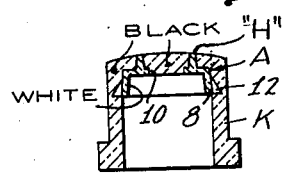
Fig. 14.
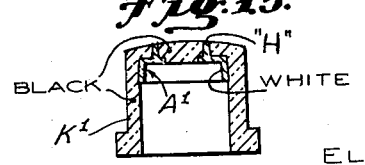
Fig. 15.
Fig. 16.
INVENTORS
FLOYD J. DOFSEN
ELMER L. DANIELSON
BY
Munn, Liddy & Glaccum
ATTORNEYS Patented June 6, 1950

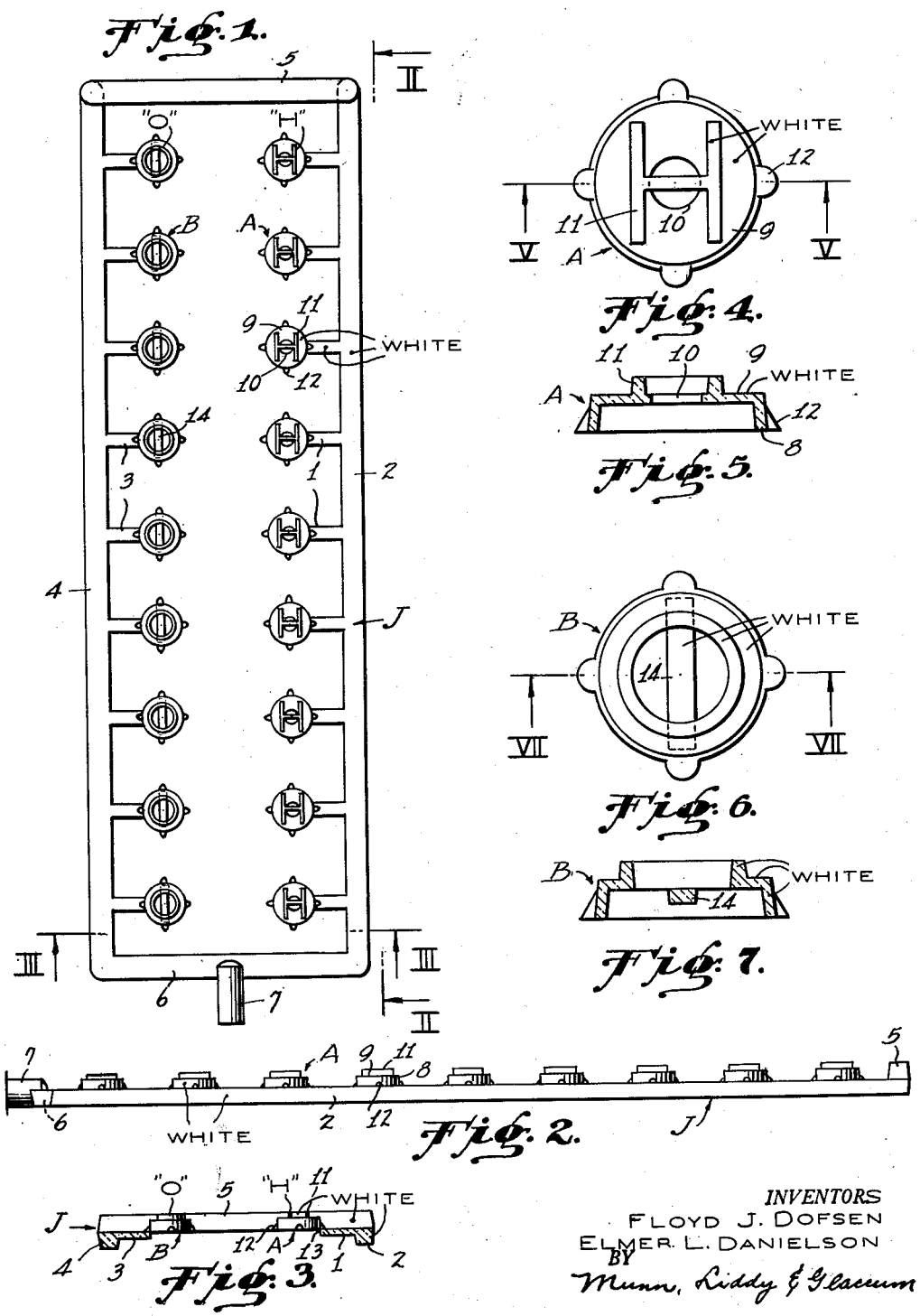

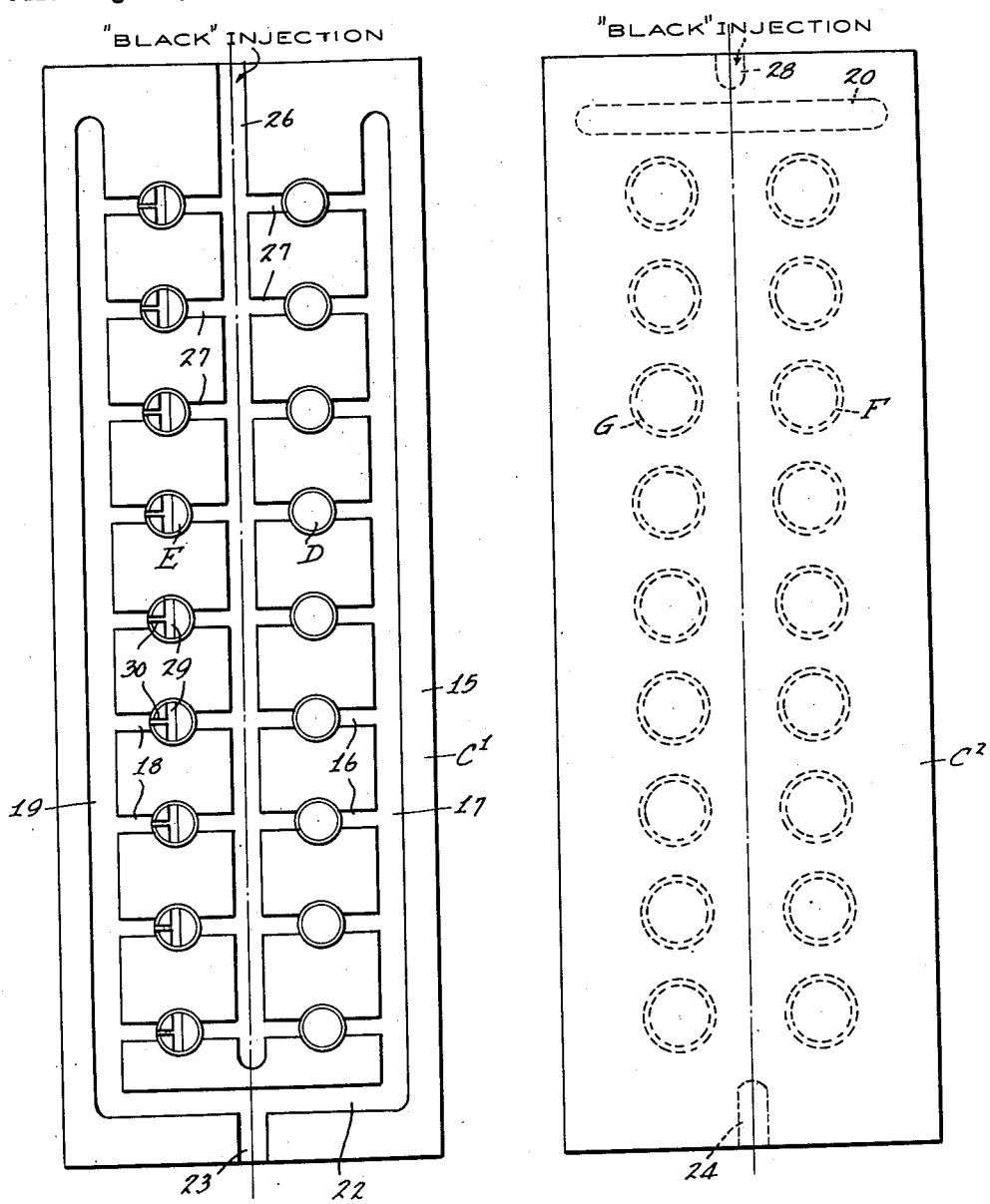

2,510,091

UNITED STATES PATENT OFFICE 2,510,091

METHOD OF SEVERING SPRUES FROM A MOLDED PART AND SIMULTANEOUSLY MOLDING A SECOND PLASTIC TO THE PART

Floyd J. Dofsen, Millbrae, and Elmer L. Danielson, Oakland, Calif.

Application August 26, 1947, Serial No. 770,594

5 Claims. (Cl. 18—59)

An object of our invention is to provide a method of severing sprues from a thermoplastic molded article and simultaneously casting a second thermoplastic material around the article which makes use of a mold that has recesses for receiving the severed sprue, the mold carrying sprue-severing means that will sever the sprue from the article during the closing of the mold.

A further object of our invention is to provide a method of the type described in which the sprue forming a part of the second thermoplastic material adheres to the severed sprue of the first article, whereby the product formed of the two thermoplastic materials and the two sprues may be removed from the mold as a unit. A plurality of products can be simultaneously molded in this manner.

A still further object of our invention is to provide a method of the type described in which the two thermoplastic materials may be bonded together in the manner set forth in our copending application on a Process and apparatus for bonding thermoplastic materials, filed July 15, 1947, Serial No. 761,128, Patent No. 2,492,973. It is also possible to mechanically connect the two thermoplastic materials together.

Other objects and advantages will appear in the following specification, and the novel features of the device will be particularly pointed out in the appended claims.

Our invention is illustrated in the accompanying drawing forming a part of this application, in which:

Figure 1 is a top plan view of a plurality of thermoplastic articles shown interconnected by sprues;

Figure 2 is a side elevation of Figure 1, when looking in the direction of the arrows II—II of Figure 1;

Figure 3 is a transverse section taken along the line III—III of Figure 1;

Figure 4 is an enlarged top plan view of one of the articles shown in Figure 1;

Figure 5 is a transverse section taken along the line V—V of Figure 4;

Figure 6 is an enlarged top plan view of another one of the articles shown in Figure 1;

Figure 7 is a transverse section taken along the line VI—VI of Figure 6;

Figure 10 is a top plan view of the lower mold or die illustrated in Figures 8 and 9;

Figure 11 is a top plan view of the upper mold or die illustrated in Figures 8 and 9;

Figure 12 is a top plan view of the final product showing a plurality of articles each formed of two thermoplastic materials of preferably contrasting colors, and also showing the sprues for the two materials;

Figure 13 is a top plan view of the sprue for the articles formed from the first thermoplastic material;

Figure 14 is an enlarged transverse section through the product formed of two thermoplastic materials, showing them mechanically bonded by the use of laterally projecting portions on the first thermoplastic article embedded in the second thermoplastic material;

Figure 15 is a transverse section on an enlarged scale of the first thermoplastic article shown without the laterally extending projections; and Figure 16 is a transverse section showing the article of Figure 15, bonded to the second thermoplastic material.

Figure 8:
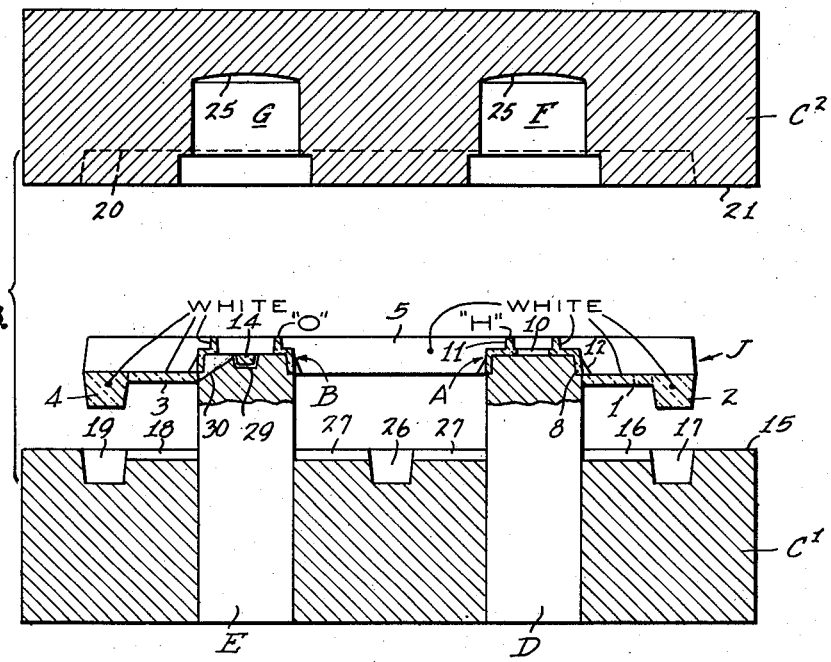
Figure 8 is a transverse section through an opened mold that receives the second thermoplastic material and shows the articles of Figure 1, and their sprues in position.

While we have shown only the preferred forms of our invention, it should be understood that various changes or modifications may be made within the scope of the appended claims without departing from the spirit and scope of the invention.

In carrying out our invention, we cast a plurality of articles such as key characters "H" and "O" in Figure 1, these articles being indicated at A and B. The key characters are cast in a mold, not shown, from a thermoplastic material of any desired color. We have shown the material as being "white" in Figure 1. We do not wish to be confined to key characters because various types of articles may be molded.

The key characters A have branch sprues 1 connected to a longitudinally extending sprue 2 while the key characters B have branch sprues 3 connected to a longitudinally extending sprue 4. The longitudinally extending sprues 2 and 4 are interconnected by transversely extending sprues 5 and 6 and the latter has a feed sprue 7 centrally disposed between the ends thereof. It is possible to arrange the sprues in various ways so we do not wish to be confined to any particular arrangement. The main point is that the molded article has at least one sprue extending therefrom.

The key character A is shown on an enlarged scale in Figures 4 and 5 and the branch sprue 1 is disconnected therefrom. In actual practice the branch sprue 1 is severed from the key character by the closing of the mold that receives the second thermoplastic material. The cross sectional view of the key character in Figure 5 shows that it is cup-shaped with a rim portion 8 and a top 9 that has a central opening 10 therein. A raised letter, such as the letter "H" indicated at 11 extends above the top and the rim or apron has outwardly extending projections or tits 12 of the shape shown: Figure 3 illustrates the weak "break point" 13 between the branch sprues 1 and the articles A. The breaking of the sprue at this point is accomplished by the second mold during its closing operation, in a manner hereinafter described. The projection 12 overlying the branch sprue 1 will remain affixed to the article A during the severing movement.

The article B differs from the article A only in that a closed character "O" is indicated and this requires a central reinforcing and supporting rib 14, see Figures 6 and 7. The remainder of the key character is the same as that shown in Figures 4 and 5 and therefore further description need not be given of this article.

Figure 9:
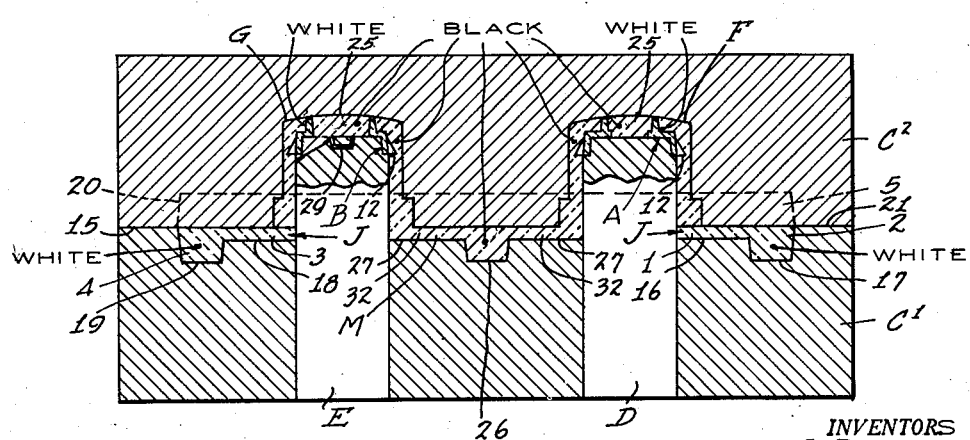
Figure 9 is a view similar to Figure 8, but showing the mold closed, the sprues of the first articles severed, and the second thermoplastic material flowed around the articles.

When casting the second thermoplastic material to combine with the first, it is necessary to sever the branch sprues 1 and 3 from their key characters A and B, respectively. We accomplish this by causing the mold for the second casting to sever the sprues during the closing movement of the mold. Figures 8 and 9 illustrate the lower and upper halves C1 and C2 of a mold that receives the key characters A and B with their sprues, preparatory to casting the second thermoplastic material to combine with the key characters.

The lower mold half C1 has a plurality of core members, the core members D receiving and supporting the key characters A and the core members E receiving and supporting the key characters B. The key characters A and B support the sprues 1 to 7, inclusive, above the upper face 15 of the lower mold half C1. Both Figures 8 and 10 illustrate how the upper face 15 of the lower mold half C1 has grooves 16 for receiving the branch sprues 1, groove 17 for receiving the sprue 2, grooves 18 for receiving the branch sprues 3, and a groove 19 for receiving the sprue 4.

The upper mold half C2 has a groove 20 in its lower surface 21 for receiving the transverse sprue 5. The lower mold half C1 has a groove 22 for receiving the sprue 6 and both mold halves C1 and C2 have registering grooves 23 and 24, respectively, for receiving the sprue 7. The upper mold C2 has cavities F and G for receiving the cores D and E, respectively. These cavities are shaped for forming the outer contours of the keys which are to be cast.

Figure 9 shows the cores D and E holding the key characters A and B in a position where the tops of the letters "H" and "O" will contact the inner ends 25 of the cavities. During the closing movement of the two mold halves C1 and C2 the under surface 21 of the upper mold will strike the branch sprues 1 and 3 and sever them from the key characters A and B. The entire sprue frame J will drop away from the key characters and will be received in the grooves provided in the upper surface of the lower mold half and in the lower surface of the upper mold half. This is one of the important features of our invention.

After the mold halves C1 and C2 close, the second thermoplastic material is injected into the cavities F and G. Figure 10 shows the upper surface 15 of the lower mold half C1 provided with a central groove 26 from which branch grooves 27 extend and communicate with the cavities F and G when the mold halves are closed. The upper mold C2 has a recess 28 that registers with the entrance end of the groove 26 in the lower mold half C1. The second thermoplastic material is preferably of a different color from the first material. By way of example we have shown the first material as being white and the second material "black." The second plastic flows along the grooves 26 and 27 and fills the cavities F and G.

Figure 9 illustrates how the second plastic flows around the "H" character on the member A. The projections 12 are embedded in the second plastic so as to mechanically connect the two plastics. Figures 12 and 14 show the complete key K with the letter "H" of the member A showing through its upper surface.

Referring again to Figures 8, 9 and 10, the cores E supporting the members B with the closed characters "O," have grooves 29 in their upper ends for receiving the ribs 14. The walls of the grooves 29 are spaced from the adjacent walls of the ribs 14 so that the second thermoplastic material can fill the spaces provided and anchor the portion of the material filling the center of the "O" to the rib so that this center cannot fall out.

The cores E also have transverse grooves 30 that place the grooves 27 in communication with the interior of the cavities G so that the second thermoplastic material flowed into this cavity will fill the groove 29 and the central portion of the "O." The material in the grooves 30 will provide reinforcing webs between the central portions of the "O" and the walls of the keys. We do not wish to be confined to this particular manner of supporting the central portion of a closed letter. The completed key with the letter "O" is shown at L in Figure 12. Although the key is shown in Figure 14, the key L will look the same in cross section except for the addition of the web formed by the groove 30.

As soon as the second thermoplastic material has been injected into the mold and set, the mold halves C1 and C2 may be opened and the product shown in Figure 12 removed as a unit. This product comprises the completely formed keys K and L and the original sprue frame J. It also includes the second sprue spider M that has been formed by the second thermoplastic material flowing along the groove 26 and branch grooves 27. The sprue frame J lifts out with the sprue spider M because both are interconnected by contact at the point 31. The completed keys K and L are already freed from the branch sprues 1 and 3 due to the initial closing action of the mold halves C1 and C2. It is a simple matter to remove the completed keys K and L from the branch sprues 32 of the spider M. The sprue frame J when separated from the keys is illustrated in Figure 13.

It is possible to bond the key characters to the key bodies by a solvent rather than by mechanical bonding. Our copending application shows such bonding. Figures 15 and 16 of the present case illustrates such a modified method. The key character A1 shown in Figure 15 is the same as the key character A except the projections 12 are eliminated. A solvent is applied to the outer surface as indicated and while the surface is in a softened condition to an appreciable depth, the second thermoplastic material is flowed around the first under pressure and will become bonded to the member A1. The completed key is indicated at K1 in Figure 16.

We claim:

1. In the herein described method of forming a product composed of at least two thermoplastic materials, which includes the steps of: casting a portion of the product with an integral sprue from a thermoplastic material of one color; placing the casting and its sprue on a projection in a mold so as to be held in spaced relation to the base of the mold, closing the mold around the casting to apply a shearing pressure between the sprue and casting for severing the sprue from the casting; and injecting a second thermoplastic material into the mold around the severed casting for bonding with the latter.

2. In the herein described method of forming a product composed of at least two thermoplastic materials, which includes the steps of: casting a portion of the product with an integral sprue from a thermoplastic material of one color; placing the casting and its sprue on the end of a core projecting from the base of one section of a mold so that the casting and sprue are held in spaced relation to said base; closing the mold around the casting to apply a shearing pressure between the sprue and casting for severing the sprue from the casting; and injecting a second thermoplastic material into the mold around the severed casting for bonding with the latter.

3. In the herein described method of forming a product composed of at least two thermoplastic materials, which includes the steps of: casting a portion of the product with an integral sprue from a thermoplastic material of one color; placing the casting and its sprue on the end of a core projecting from the base of one section of a mold so that the casting and sprue are held in spaced relation to said base; closing around the casting a second mold section having a cavity in the face thereof, said closing applying a shearing pressure between the sprue and casting for severing the sprue from the casting, the sprue being deposited in a groove in the mold and injecting a second thermoplastic material into the mold around the severed casting for bonding with the latter.

4. In the herein described method of forming a product composed of at least two thermoplastic materials, which includes the steps of: casting a portion of the product with an integral sprue from a thermoplastic material of one color; placing the casting and its sprue on the end of a core projecting from the base of one section of a mold so that the casting and sprue are held in spaced relation to said base; closing around the casting a second mold section having a cavity in the face thereof, said core and cavity telescoping to apply a shearing pressure between the sprue and casting for severing the sprue from the casting and injecting a second thermoplastic material into the mold around the severed casting for bonding with the latter.

5. In the herein described method of forming a product composed of at least two thermoplastic materials, which includes the steps of: casting a portion of the product with an integral sprue from a thermoplastic material of one color; placing the casting and its sprue on the end of a core projecting from the base of one section of a mold so that the casting and sprue are held in spaced relation to said base; closing around the casting a second mold section having a cavity in the face thereof, said core and cavity telescoping to apply a shearing pressure between the sprue and casting for severing the sprue from the casting, the sprue being deposited in a groove in the mold and injecting a second thermoplastic material into the mold around the severed casting for bonding with the latter.

FLOYD J. DOFSEN.
ELMER L. DANIELSON.

REFERENCES CITED

The following references are of record in the file of this patent:

UNITED STATES PATENTS

| Number | Name | Date |
| --- | --- | --- |
| 2,266,432 | Morin et al. | Dec. 16, 1941 |
| 2,266,433 | Morin et al. | Dec. 16, 1941 |
| 2,285,963 | Gits et al. | June 9, 1942 |
| 2,333,059 | Tucker | Oct. 26, 1943 |
| 2,345,305 | Thornton | Mar. 28, 1944 |